United States Patent
Wu

(10) Patent No.: US 11,877,339 B2
(45) Date of Patent: Jan. 16, 2024

(54) CHANNEL ACCESS METHOD, CONFIGURATION METHOD, TERMINAL, AND NETWORK SIDE DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 349 days.

(21) Appl. No.: 17/211,810

(22) Filed: Mar. 24, 2021

(65) Prior Publication Data

US 2021/0235532 A1    Jul. 29, 2021

Related U.S. Application Data

(63) Continuation of application No. PCT/CN2019/103017, filed on Aug. 28, 2019.

(30) Foreign Application Priority Data

Sep. 27, 2018    (CN) .......................... 201811134411.4

(51) Int. Cl.
*H04W 76/19*    (2018.01)
*H04W 76/11*    (2018.01)
(Continued)

(52) U.S. Cl.
CPC .......... *H04W 76/19* (2018.02); *H04B 7/0695* (2013.01); *H04W 36/00837* (2018.08);
(Continued)

(58) Field of Classification Search
CPC ..... H04W 76/19; H04W 76/11; H04W 76/27; H04W 36/00837; H04W 74/0833; H04B 7/0695

See application file for complete search history.

(56) References Cited

U.S. PATENT DOCUMENTS

2016/0316490 A1* 10/2016 Wang .................... H04W 76/10
2017/0104562 A1    4/2017 Doken et al.
(Continued)

FOREIGN PATENT DOCUMENTS

CN        106559795    *    4/2017
CN        106559795 A       4/2017
(Continued)

OTHER PUBLICATIONS

International Search Report issued in corresponding International Application No. PCT/CN2019/103017, dated Nov. 27, 2019, 4 pages.
(Continued)

*Primary Examiner* — Mewale A Ambaye
(74) *Attorney, Agent, or Firm* — IPX PLLC

(57) ABSTRACT

The present disclosure provides a channel access method, a configuration method, a terminal, and a network side device. The channel access method applied to the terminal includes: determining, based on a mapping between service information and a channel access parameter, a target channel access parameter corresponding to first service information, where the first service information is service information triggering a first physical channel; and accessing the first physical channel based on the target channel access parameter.

15 Claims, 3 Drawing Sheets

Transmit a mapping between service information and a channel access parameter — 301

(51) Int. Cl.
- *H04W 76/27* (2018.01)
- *H04W 36/00* (2009.01)
- *H04B 7/06* (2006.01)
- *H04W 74/08* (2009.01)

(52) U.S. Cl.
CPC ........ *H04W 74/0833* (2013.01); *H04W 76/11* (2018.02); *H04W 76/27* (2018.02)

(56) References Cited

U.S. PATENT DOCUMENTS

| | | | |
|---|---|---|---|
| 2017/0181155 A1* | 6/2017 | Chen | H04W 72/23 |
| 2017/0331577 A1* | 11/2017 | Parkvall | H04J 11/0079 |

FOREIGN PATENT DOCUMENTS

| | | | | |
|---|---|---|---|---|
| WO | 2016138841 A1 | 9/2016 | | |
| WO | WO-2016138841 A1 * | 9/2016 | | H04L 1/1887 |

OTHER PUBLICATIONS

3GPP, "3rd Generation Partnership Project; Technical Specification Group Services and System Aspects; Release 14 Description; Summary of Rel-14 Work Items(Release 14)", 3GPP TR 21.914 V2.0.0 (Mar. 2018).

* cited by examiner

CHANNEL ACCESS METHOD, CONFIGURATION METHOD, TERMINAL, AND NETWORK SIDE DEVICE

CROSS-REFERENCE TO RELATED APPLICATIONS

This application is a continuation of PCT Application No. PCT/CN2019/103017 filed Aug. 28, 2019, which claims priority to Chinese Patent Application No. 201811134411.4 filed in China on Sep. 27, 2018, both of which are incorporated herein by reference in their entireties.

TECHNICAL FIELD

Embodiments of the present disclosure relate to the field of communications technologies, and in particular, to a channel access method, a configuration method, a terminal, and a network side device.

BACKGROUND

In a 5th generation (5th-Generation, 5G) mobile communications system, signals are received and sent by using an unlicensed band. Before sending a signal by using an unlicensed band, a transmit end needs to monitor whether the band is idle, and if the band is idle, the transmit end may access a physical channel, and send the signal on the band. A time length used by the transmit end to monitor whether the unlicensed band is idle is related to a channel access parameter of the physical channel.

In the current 5G mobile communications system, a fixed channel access parameter is used for a same physical channel. Therefore, a time length used by a transmit end to monitor, before accessing a physical channel, whether an unlicensed band is idle is also fixed, leading to low channel access flexibility.

SUMMARY

Embodiments of the present disclosure provide a channel access method, a configuration method, a terminal, and a network side device, to resolve a problem in a related technology that channel access flexibility is low because a fixed channel access parameter is used for a same physical channel and a time length used by a transmit end to monitor, before accessing a physical channel, whether an unlicensed band is idle is also fixed.

To resolve the foregoing problem, the present disclosure is implemented as follows:

According to a first aspect, an embodiment of the present disclosure provides a channel access method, applied to a terminal. The channel access method includes:
  determining, based on a mapping between service information and a channel access parameter, a target channel access parameter corresponding to first service information, where the first service information is service information triggering a first physical channel; and
  accessing the first physical channel based on the target channel access parameter.

According to a second aspect, an embodiment of the present disclosure provides a configuration method, applied to a network side device. The configuration method includes:
  transmitting a mapping between service information and a channel access parameter.

According to a third aspect, an embodiment of the present disclosure further provides a terminal, including:
  a determining module, configured to determine, based on a mapping between service information and a channel access parameter, a target channel access parameter corresponding to first service information, where the first service information is service information triggering a first physical channel; and
  an execution module, configured to access the first physical channel based on the target channel access parameter.

According to a fourth aspect, an embodiment of the present disclosure further provides a network side device, including:
  a sending module, configured to transmit a mapping between service information and a channel access parameter.

According to a fifth aspect, an embodiment of the present disclosure further provides a terminal, including a processor, a memory, and a computer program stored in the memory and executable on the processor. The computer program, when executed by the processor, implements the steps of the channel access method.

According to a sixth aspect, an embodiment of the present disclosure further provides a network side device, including: a processor, a memory, and a computer program stored in the memory and executable on the processor. The computer program, when executed by the processor, implements the steps of the configuration method.

According to a seventh aspect, an embodiment of the present disclosure further provides a computer readable storage medium. The computer readable storage medium stores a computer program. The computer program, when executed by a processor, implements the steps of the channel access method or the steps of the configuration method.

In the embodiments of the present disclosure, the terminal determines, based on the mapping between the service information and the channel access parameter, the target channel access parameter corresponding to the first service information, where the first service information is the service information triggering the first physical channel; and accesses the first physical channel based on the target channel access parameter. It can be learned that in the present disclosure, the channel access parameter of the first physical channel can be determined based on the service information triggering the first physical channel, to determine a monitoring time length, thereby improving channel access flexibility.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Terms "first" and "second" in this application are used to distinguish between similar objects, and do not need to be used to describe a specific order or sequence. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" used in this application means at least one of the connected objects. For example, A and/or B and/or C represents the following seven cases: Only A exists, only B exists, only C exists, both A and B exist, both B and C exist, both A and C exist, or A, B, and C all exist.

Figure 1:
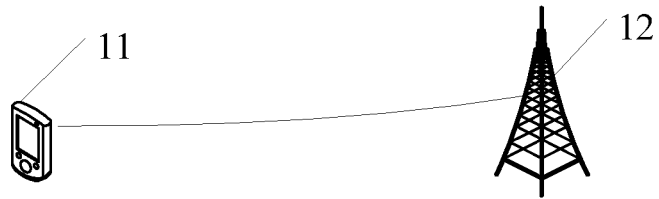
FIG. 1 is a structural diagram of a network system to which embodiments of the present disclosure can be applied.

FIG. 1 is a structural diagram of a network system to which the embodiments of the present disclosure can be applied. As shown in FIG. 1, the network system includes a terminal 11 and a network side device 12. The terminal 11 and the network side device 12 may communicate with each other by using a network.

In this embodiment of the present disclosure, the terminal 11 may be also referred to as a user terminal ( ). During specific implementation, the terminal 11 may be a terminal-side device such as a mobile phone, a tablet personal computer (Tablet Personal Computer), a laptop computer (Laptop Computer), a personal digital assistant (PDA), a mobile internet device (MID), a wearable device (Wearable Device), or a vehicle-mounted device. It should be noted that a specific type of the terminal 11 is not limited in the embodiments of the present disclosure.

The network side device 12 may be a base station, a relay, an access point, or the like. The base station may be a base station (for example, a 5G NR NB) of 5G and later versions, or a base station (for example, an evolved NodeB (eNB)) in another communications system. It should be noted that a specific type of the network side device 12 is not limited in the embodiments of the present disclosure.

For ease of description, the following describes some content in the embodiments of the present disclosure:

Introduction to new radio-unlicensed (NR-U).

In a 5G system, data is received and transmitted by using an unlicensed band, and a transmit end of a signal needs to meet a use rule of the unlicensed band. For an unlicensed band, before sending a signal, a transmit end needs to monitor whether the band is occupied (or is idle), and if the band is not occupied (or is idle), the transmit end may send the signal.

In a current design of the 5G system, for different channel access parameters, time lengths used by UE to monitor whether an unlicensed band is idle are different. For example, a higher channel access priority class indicates shorter duration used by the UE to monitor whether the unlicensed band is idle. In other words, usage permission of an available frequency is obtained by using shorter monitoring time. The channel access parameter may include, but not limited to, a channel access priority class (Channel Access Priority Class) and/or a channel access type (Channel Access type).

In the current 5G system, different channel access parameters may be used for different physical channels. However, for a same physical channel, a fixed channel access parameter is used. As a result, a channel access parameter of a physical channel cannot be processed based on a service type. In other words, for a same physical channel, a same monitoring time length is used for different service types triggering the physical channel. Therefore, for a same physical channel, there is no difference between a time length for monitoring, for a higher-priority service, whether an unlicensed band is idle and a monitoring time length for a lower-priority service. As a result, signal sending triggered by a higher-priority service is easily delayed or a sending failure is easily caused.

For the foregoing problem, the embodiments of the present disclosure provide a channel access method, so that a terminal can determine a channel access parameter of a physical channel based on service information triggering the physical channel, to determine a monitoring time length, thereby improving channel access flexibility. Therefore, signal sending triggered by a high-priority service more easily pre-empts a channel, and a shorter signal sending delay and less signal loss are implemented.

The following describes the channel access method in the embodiments of the present disclosure.

Figure 2:
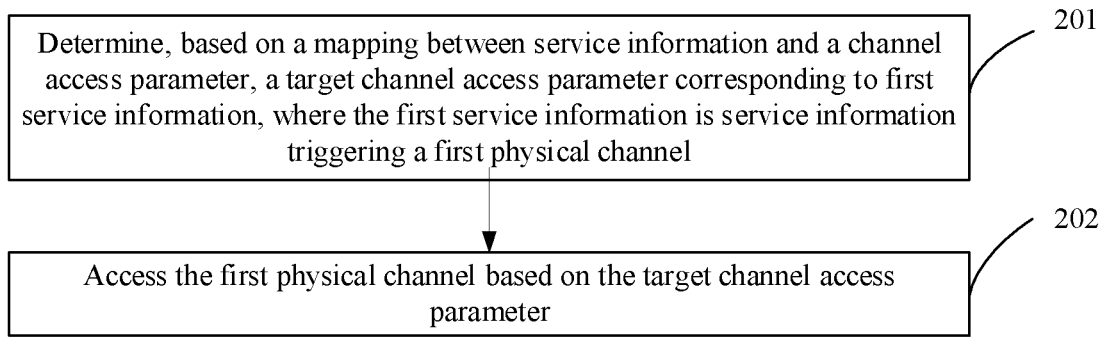
FIG. 2 is a flowchart of a channel access method according to an embodiment of the present disclosure.

FIG. 2 is a flowchart of a channel access method according to an embodiment of the present disclosure. The channel access method in this embodiment is applied to a terminal.

As shown in FIG. 2, the channel access method in this embodiment includes the following steps.

Step 201. Determine, based on a mapping between service information and a channel access parameter, a target channel access parameter corresponding to first service information, where the first service information is service information triggering a first physical channel.

During specific implementation, UE may pre-obtain the mapping between the service information and the channel access parameter. A specific representation manner of obtaining is related to a source of the mapping. In this embodiment, optionally, the mapping is configured by a network side device, or predefined in a protocol.

Specifically, if the mapping is configured by the network side device, the UE may receive the mapping that is configured by the network side device and that is between the service information and the channel access parameter. In this way, the network side device may adjust the mapping between the service information and the channel access parameter, to improve flexibility of determining the mapping.

If the mapping is predefined in the protocol, the UE may directly read the mapping between the service information and the channel access parameter from the protocol. In this way, the network side device does not need to send the mapping, to reduce signaling overheads.

In the mapping, the service information may be used to trigger a physical channel, in other words, trigger signal sending on the physical channel, or trigger sending on the physical channel, and the channel access parameter may be used to detect, during sending on the physical channel, whether an unlicensed band is idle. The physical channel may be, but not limited to, a physical uplink control channel (PUCCH) or a physical random access channel (PRACH).

Optionally, the channel access parameter may include at least one of a channel access priority class and a channel access type.

It should be noted that in this embodiment, a priority of the channel access priority class and the priority of a channel access type may be in inverse proportion to a monitoring time length. In other words, a higher channel access priority class indicates a shorter monitoring time length corresponding to the channel access priority class, and the UE may obtain available band use permission by using shorter time. A higher-priority channel access type indicates a shorter monitoring time length corresponding to the channel access type, and the UE may obtain available band use permission by using shorter monitoring time.

Optionally, the service information may include at least one of a trigger event and information about a logical channel.

The trigger event may be understood as a signal sending trigger event, and the information about the logical channel may be understood as information about a logical channel corresponding to triggered signal sending.

During specific implementation, signal sending may be represented as, but not limited to, sending of Msg1 (a message 1) in a random access procedure, or sending of a scheduling request (SR). Different signal sending corresponds to different trigger events.

Further, in a random access procedure, the trigger event may include at least one of the following:
  initial access for radio resource control (RRC) idle (Idle) mode or inactive (Inactive) mode;
  mode transition from the RRC inactive mode (for example, transit to an RRC connected mode);
  an RRC connection re-establishment procedure;
  handover;
  addition or modification of a primary secondary cell (Pscell);
  downlink data or uplink data arrival during RRC connected modewhen an uplink synchronization status is out-of-synchronization;
  establishment of uplink timing alignment for a secondary cell (SCell);
  request for system information; and
The trigger event may be represented as a trigger event of Msg1 sending in a random access procedure.

A trigger event of SR sending may be, but not limited to, that the UE does not have an SR resource or the SR reaches a largest quantity of sending times.

Further, the information about the logical channel may include at least one of the following:
  an identity of the logical channel (for example, a logical channel 1);
  a group identity of the logical channel (for example, a logical channel group 1);
  a priority of the logical channel (for example, a priority 1 of the logical channel);
  a cell identity corresponding to the logical channel (for example, a cell 1);
  a cell type identity corresponding to the logical channel (for example, a primary cell (PCell), a PSCell, or an Scell);
  a cell group corresponding to the logical channel (for example, a master cell group (MCG) or a secondary cell group (SCG));
  data-type control signaling (for example, RRC control signaling) or service data corresponding to the logical channel (for example, data corresponding to a dedicated traffic channel (DTCH)); and
  a control signaling type corresponding to the logical channel (for example, common control channel (CCCH) control signaling or DCCH control signaling).

The information about the logical channel may be represented as information about a logical channel corresponding to triggering of the Msg1 sending in the random access procedure, or information about a logical channel corresponding to triggering of the SR sending.

During actual application, a plurality of pieces of service information may trigger a same physical channel. Further, in the mapping, different service information triggering a same physical channel may correspond to different channel access parameters. In other words, the network side device may configure a plurality of (at least two) channel access parameters available for a particular physical channel and service information corresponding to the channel access parameters or a plurality of (at least two) channel access parameters available for a particular physical channel and service information corresponding to the channel access parameters may be agreed on in a protocol.

In this way, after determining the first service information triggering the first physical channel, the UE may search the mapping to determine the target channel access parameter corresponding to the first service information, to access the first physical channel based on the target channel access parameter. In other words, the target channel access parameter may be determined as the channel access parameter of the physical channel, to improve channel access flexibility.

For example, for sending on a PRACH channel, the network side device may make the following configuration: for sending, on the PRACH, triggered by beam failure recovery, a channel access parameter of the PRACH may be represented as "a channel access priority class 1" and "a channel access type 1"; for sending, on the PRACH, triggered by arrival of uplink data on a logical channel 1, a channel access parameter of the PRACH may be represented as "a channel access priority class 2" and "a channel access type 2"; and for sending, on the PRACH, triggered by arrival of uplink data on a logical channel 2, a channel access parameter of the PRACH may be represented as "a channel access priority class 3" and "a channel access type 2".

In this way, when uplink data of UE on a logical channel 1 (a priority of the logical channel of the logical channel is 1) arrives, a buffer status report (BSR) is generated for the arrival of the uplink data on the logical channel 1 and is reported. Because the UE does not have an SR resource or an SR reaches a largest quantity of sending times, the BSR including the data on the logical channel 1 triggers reporting on a PRACH, a channel access priority class of the PRACH is "a channel access priority class 2", and a channel access type is "a channel access type 2".

Step 102. Access the first physical channel based on the target channel access parameter.

During specific implementation, the target channel access parameter is used to detect whether an unlicensed band is idle during sending on the first physical channel.

In this embodiment, the number of elements included in the target channel access parameter corresponding to the first service information may be 1 or may be greater than 1.

When the number of elements included in the target channel access parameter is 1, the UE may directly access the first physical channel based on the target channel access parameter, and sends a signal by using the first physical channel after successfully accessing the first physical channel.

When the number of elements included in the target channel access parameter is greater than 1, optionally, the accessing the first physical channel based on the target channel access parameter includes:

accessing the first physical channel by using a channel access priority class having a highest priority in the channel access priority class included in the target channel access parameter; or accessing the first physical channel by using a channel access priority class having a lowest priority in the channel access priority class included in the target channel access parameter; or accessing the first physical channel by using a channel access type having a highest priority in the channel access type included in the target channel access parameter; or accessing the first physical channel by using a channel access type having a lowest priority in the channel access type included in the target channel access parameter.

It should be understood that a scenario in which the number of elements included in the target channel access parameter is greater than 1 may include:

Scenario 1: The first service information includes at least two pieces of service information, and the at least two pieces of service information include at least two pieces of service information corresponding to different channel access parameters.

Scenario 2: The first service information includes only one piece of service information, and a channel access parameter corresponding to the service information includes a channel access priority class and a channel access type.

For a manner of accessing the first physical channel by using the channel access priority class having the highest priority in the channel access priority class included in the target channel access parameter, for example, a BSR triggering reporting on a PRACH includes data corresponding to a logical channel priority 1 (corresponding to "a channel access priority class 1") and data corresponding to a logical channel priority 2 (corresponding to "a channel access priority class 2"). Then, "the channel access priority class 1" is used for sending on the PRACH.

In this way, the UE can shorten, by shortening monitoring time, time for accessing the first physical channel, to reduce a sending delay of a signal sent on the first physical channel and reduce a signal loss.

For a manner of accessing the first physical channel by using the channel access priority class having the lowest priority in the channel access priority class included in the target channel access parameter, for example, a BSR triggering reporting on a PRACH includes data corresponding to a logical channel priority 1 (corresponding to "a channel access priority class 1") and data corresponding to a logical channel priority 2 (corresponding to "a channel access priority class 2"). Then, "the channel access priority class 2" is used for sending on the PRACH.

It should be noted that in this embodiment of the present disclosure, different UE access a physical channel by using a same rule. Therefore, in this manner, although the UE spends long time in accessing the first physical channel, the UE in this embodiment may be other UE (a channel access priority class having a lowest priority in a target channel access parameter of the UE is higher than the channel access priority class having the lowest priority in the target channel access parameter of the UE in this embodiment), to reduce time for accessing a physical channel, to shorten a signal sending delay of the other UE and reduce a signal loss of the other UE.

For a manner of accessing the first physical channel by using the channel access type having the highest priority in the channel access type included in the target channel access parameter, for example, a BSR triggering reporting on a PRACH includes data corresponding to a logical channel priority 1 (corresponding to "a channel access type 1") and data corresponding to a logical channel priority 2 (corresponding to "a channel access type 2"). Then, "the channel access type 1" is used for sending on the PRACH.

In this way, the UE can shorten, by shortening monitoring time, time for accessing the first physical channel, to reduce a sending delay of a signal sent on the first physical channel and reduce a signal loss.

For a manner of accessing the first physical channel by using the channel access type having the lowest priority in the channel access type included in the target channel access parameter, for example, a BSR triggering reporting on a PRACH includes data corresponding to a logical channel priority 1 (corresponding to "a channel access type 1") and data corresponding to a logical channel priority 2 (corresponding to "a channel access type 2"). Then, "the channel access type 2" is used for sending on the PRACH.

It should be noted that in this embodiment of the present disclosure, different UE access a physical channel by using a same rule. Therefore, in this manner, although the UE spends long time in accessing the first physical channel, the UE in this embodiment may be other UE (a channel access type having a lowest priority in a target channel access parameter of the UE is higher than the channel access type having the lowest priority included in the target channel access parameter of the UE in this embodiment), to reduce time for accessing a physical channel, to shorten a signal sending delay of the other UE and reduce a signal loss of the other UE.

During actual application, the UE may first determine to select a channel access priority class in a target channel access parameter or a channel access type in a target channel access parameter to access the first physical channel. Then, the UE determines to select a channel access priority class (or a channel access type) having a highest priority or a lowest priority in the target channel access parameter, to access the first physical channel.

It should be noted that the plurality of optional implementations described in this embodiment of the present disclosure may be implemented in combination with each other or may be implemented separately. This is not limited in this embodiment of the present disclosure.

In the channel access method in this embodiment, the terminal determines, based on the mapping between the service information and the channel access parameter, the target channel access parameter corresponding to the first service information, where the first service information is the service information triggering the first physical channel; and accesses the first physical channel based on the target channel access parameter. It can be learned that in the present disclosure, the channel access parameter of the first physical channel can be determined based on the service information triggering the first physical channel, to determine a monitoring time length, thereby improving channel access flexibility.

Figure 3:
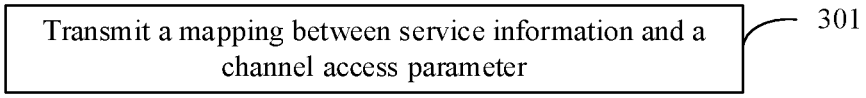
FIG. 3 is a flowchart of a configuration method according to an embodiment of the present disclosure.

FIG. 3 is a flowchart of a configuration method according to an embodiment of the present disclosure. The configuration method in this embodiment is applied to a network side device.

As shown in FIG. 3, the configuration method in this embodiment may include the following steps.

Step 301. Transmit a mapping between service information and a channel access parameter.

In this embodiment, the network side device may configure the mapping between the service information and the channel access parameter for a terminal, to improve flexibility of configuring the mapping between the service information and the channel access parameter.

Optionally, the channel access parameter includes at least one of a channel access priority class and a channel access type.

Optionally, the service information includes at least one of a trigger event and information about a logical channel.

Further, in a random access procedure, the trigger event includes at least one of the following:
  initial access for RRC idle mode or inactive mode;
  mode transition from the RRC inactive mode;
  an RRC connection re-establishment procedure;
  handover;
  addition or modification of a PSCell;
  downlink data or uplink data arrival during RRC connected modewhen an uplink synchronization status is out-of-synchronization;
  establishment of uplink timing alignment for a SCell;
  request for system information; and Further, the information about the logical channel includes at least one of the following:
  an identity of the logical channel;
  a group identity of the logical channel;
  a priority of the logical channel;
  a cell identity corresponding to the logical channel;
  a cell type identity corresponding to the logical channel;
  a cell group corresponding to the logical channel;
  data-type control signaling or service data corresponding to the logical channel; and
  a control signaling type corresponding to the logical channel.

It should be noted that the plurality of optional implementations described in this embodiment of the present disclosure may be implemented in combination with each other or may be implemented separately. This is not limited in this embodiment of the present disclosure.

In addition, this embodiment serves as an implementation of the network side device corresponding to the foregoing method embodiment. Therefore, reference may be made to related descriptions in the foregoing method embodiment, and same beneficial effects can be achieved. To avoid repeated descriptions, details are not described herein again.

Figure 4:
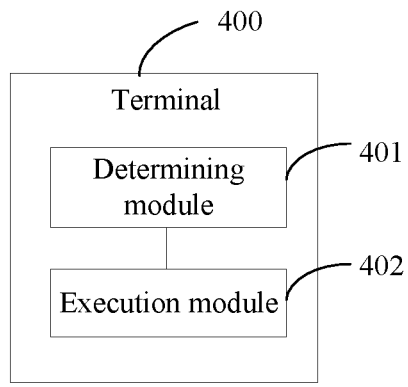
FIG. 4 is a first structural diagram of a terminal according to an embodiment of the present disclosure.

FIG. 4 is a first structural diagram of a terminal according to an embodiment of the present disclosure. As shown in FIG. 4, the terminal 400 includes:
  a determining module 401, configured to determine, based on a mapping between service information and a channel access parameter, a target channel access parameter corresponding to first service information, where the first service information is service information triggering a first physical channel; and
  an execution module 402, configured to access the first physical channel based on the target channel access parameter.

Optionally, the channel access parameter includes at least one of a channel access priority class and a channel access type.

Optionally, the service information includes at least one of a trigger event and information about a logical channel.

Optionally, in a random access procedure, the trigger event includes at least one of the following:
  initial access for RRC idle mode or inactive mode;
  mode transition from the RRC inactive mode;
  an RRC connection re-establishment procedure;
  handover;
  addition or modification of a PSCell;
  downlink data or uplink data arrival during RRC connected modewhen an uplink synchronization status is out-of-synchronization;
  establishment of uplink timing alignment for a SCell;
  request for system information; and Optionally, the information about the logical channel includes at least one of the following:
  an identity of the logical channel;
  a group identity of the logical channel;
  a priority of the logical channel;
  a cell identity corresponding to the logical channel;
  a cell type identity corresponding to the logical channel;
  a cell group corresponding to the logical channel;
  data-type control signaling or service data corresponding to the logical channel; and
  a control signaling type corresponding to the logical channel.

Optionally, when the number of elements included in the target channel access parameter is greater than 1, the execution module 402 is specifically configured to:
  accessing the first physical channel by using a channel access priority class having a highest priority in the channel access priority class included in the target channel access parameter; or
  accessing the first physical channel by using a channel access priority class having a lowest priority in the channel access priority class included in the target channel access parameter; or
  accessing the first physical channel by using a channel access type having a highest priority in the channel access type included in the target channel access parameter; or
  accessing the first physical channel by using a channel access type having a lowest priority in the channel access type included in the target channel access parameter.

Optionally, the mapping is configured by a network side device, or predefined in a protocol.

The terminal 400 can implement each process in the method embodiment corresponding to FIG. 2 of the present disclosure, and achieve same beneficial effects. To avoid repetition, details are not described herein again.

Figure 5:
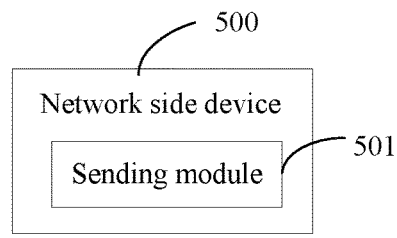
FIG. 5 is a first structural diagram of a network side device according to an embodiment of the present disclosure.

FIG. 5 is a first structural diagram of a network side device according to an embodiment of the present disclosure. As shown in FIG. 5, the network side device 500 includes:
  a sending module 501, configured to transmit a mapping between service information and a channel access parameter.

Optionally, the channel access parameter includes at least one of a channel access priority class and a channel access type.

Optionally, the service information includes at least one of a trigger event and information about a logical channel.

Optionally, in a random access procedure, the trigger event includes at least one of the following:
  initial access for RRC idle mode or inactive mode;
  mode transition from the RRC inactive mode;
  an RRC connection re-establishment procedure;
  handover;
  addition or modification of a PSCell;
  downlink data or uplink data arrival during RRC connected modewhen an uplink synchronization status is out-of-synchronization;
  establishment of uplink timing alignment for a SCell;
  request for system information; and
  beam failure recovery.

Optionally, the information about the logical channel includes at least one of the following:
  an identity of the logical channel;
  a group identity of the logical channel;
  a priority of the logical channel;
  a cell identity corresponding to the logical channel;
  a cell type identity corresponding to the logical channel;
  a cell group corresponding to the logical channel;
  data-type control signaling or service data corresponding to the logical channel; and
  a control signaling type corresponding to the logical channel.

The network side device 500 can implement each process in the foregoing method embodiment corresponding to FIG. 3 in the present disclosure, and achieve same beneficial effects. To avoid repetition, details are not described herein again.

Figure 6:
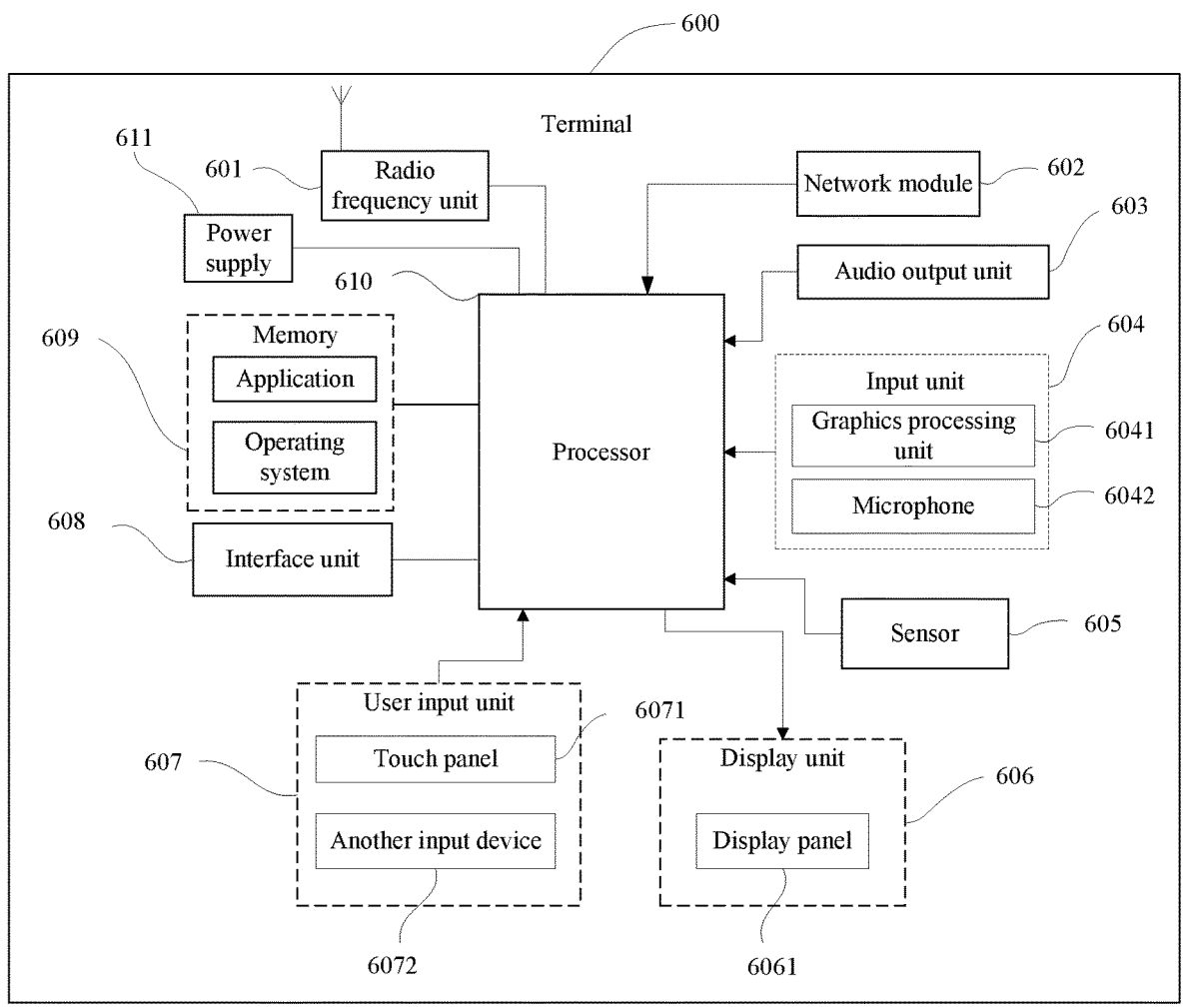
FIG. 6 is a second structural diagram of a terminal according to an embodiment of the present disclosure.

FIG. 6 is a second structural diagram of a terminal according to an embodiment of the present disclosure. The terminal may be a hardware structure of a terminal implementing the embodiments of the present disclosure. As shown in FIG. 6, the terminal 600 includes, but not limited to: a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute a limitation to the terminal. The terminal may include more or fewer components than those shown in the figure, or some components may be combined, or there may be a different component arrangement. In the embodiments of the present disclosure, the terminal includes, but not limited to, a mobile phone, a tablet computer, a notebook computer, a palmtop computer, a vehicle-mounted terminal, a wearable device, and a pedometer.

The processor 610 is configured to:
  determine, based on a mapping between service information and a channel access parameter, a target channel access parameter corresponding to first service information, where the first service information is service information triggering a first physical channel; and
  access the first physical channel based on the target channel access parameter.

Optionally, the channel access parameter includes at least one of a channel access priority class and a channel access type.

Optionally, the service information includes at least one of a trigger event and information about a logical channel.

Optionally, in a random access procedure, the trigger event includes at least one of the following:
  initial access forRRC idle mode or inactive mode;
  mode transition from the RRC inactive mode;
  an RRC connection re-establishment procedure;
  handover;
  addition or modification of a PSCell;
  downlink data or uplink data arrival during RRC connected modewhen an uplink synchronization status is out-of-synchronization;
  establishment of uplink timing alignment for a SCell;
  request for system information; and
  beam failure recovery.

Optionally, the information about the logical channel includes at least one of the following:
  an identity of the logical channel;
  a group identity of the logical channel;
  a priority of the logical channel;
  a cell identity corresponding to the logical channel;
  a cell type identity corresponding to the logical channel;
  a cell group corresponding to the logical channel;
  data-type control signaling or service data corresponding to the logical channel; and
  a control signaling type corresponding to the logical channel.

Optionally, when the number of elements included in the target channel access parameter is greater than 1, the processor 610 is further configured to:
  access the first physical channel by using a channel access priority class having a highest priority in the channel access priority class included in the target channel access parameter; or
  access the first physical channel by using a channel access priority class having a lowest priority in the channel access priority class included in the target channel access parameter; or
  access the first physical channel by using a channel access type having a highest priority in the channel access type included in the target channel access parameter; or
  access the first physical channel by using a channel access type having a lowest priority in the channel access type included in the target channel access parameter.

Optionally, the mapping is configured by a network side device, or predefined in a protocol.

It should be noted that the terminal 600 in this embodiment can implement each process in the method embodiment corresponding to FIG. 2 in the embodiments of the present disclosure, and achieve same beneficial effects. To avoid repetition, details are not described herein again.

It should be understood that in this embodiment of the present disclosure, the radio frequency unit 601 may be configured to receive and send signals in an information receiving and sending process or a calling process. Specifically, after receiving downlink data from a base station, the radio frequency unit 601 sends the downlink data to the processor 610 for processing, and sends uplink data to the base station. Generally, the radio frequency unit 601 includes, but not limited to, an antenna, at least one amplifier, a transceiver, a coupler, a low noise amplifier, and a duplexer. In addition, the radio frequency unit 601 may further communicate with another device by using a wireless communications system and a network.

The terminal provides a user with wireless broadband Internet access by using the network module 602, for example, helps the user send and receive emails, browse web pages, and access streaming media.

The audio output unit 603 may convert audio data received by the radio frequency unit 601 or the network module 602 or stored in the memory 609 into an audio signal, and output the audio signal into sound. In addition, the audio output unit 603 may further provide audio output (for example, call signal receiving sound or message receiving sound) related to a specific function performed by the terminal 600. The audio output unit 603 includes a loudspeaker, a buzzer, a receiver, and the like.

The input unit 604 is configured to receive audio or video signals. The input unit 604 may include a graphics processing unit (GPU) 6041 and a microphone 6042. The graphics processing unit 6041 processes image data of a static picture or a video obtained by an image capturing apparatus (for example, a camera) in a video capturing mode or an image capturing mode. A processed image frame can be displayed on the display unit 606. The image frame processed by the graphics processing unit 6041 may be stored in the memory 609 (or another storage medium) or sent by using the radio frequency unit 601 or the network module 602. The microphone 6042 may receive sound and can process the sound into audio data. Processed audio data can be converted, in a telephone call mode, into a format that can be sent to a mobile communications base station by using the radio frequency unit 601 for output.

The terminal 600 further includes at least one sensor 605, for example, a light sensor, a motion sensor, and another sensor. Specifically, the light sensor includes an ambient light sensor and a proximity sensor, where the ambient light sensor can adjust brightness of a display panel 6061 based on brightness of ambient light, and the proximity sensor can turn off the display panel 6061 and/or backlight when the terminal 600 is moved towards the ear. As a motion sensor, an accelerometer sensor can detect magnitude of acceleration in various directions (usually three axes), can detect magnitude and the direction of gravity when stationary, can be configured to implement functions related to terminal posture (such as switching between a landscape mode and a portrait mode, related games, and magnetometer posture calibration) identification and vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 may be configured to receive input digit or character information, and generate key signal inputs related to user settings and function control of the terminal. Specifically, the user input unit 607 includes a touch panel 6071 and another input device 6072. The touch panel 6071, also called a touch screen, can collect a touch operation of the user on or near the touch panel 6071 (for example, an operation performed by the user on or near the touch panel 6071 by using any suitable object or accessory such as a finger or a stylus). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command. In addition, the touch panel 6071 may be implemented by using a plurality of types such as a resistive type, a capacitive type, an infrared ray, and a surface acoustic wave. In addition to the touch panel 6071, the user input unit 607 may further include the another input device 6072. Specifically, the another input device 6072 may include, but not limited to, a physical keyboard, a function key (for example, a volume control key or a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides corresponding visual output on the display panel 6061 based on the type of the touch event. Although in FIG. 6, the touch panel 6071 and the display panel 6061 implement input and output functions of the terminal as two independent components, in some embodiments, the touch panel 6071 and the display panel 6061 may be integrated to implement the input and output functions of the terminal. This is not specifically limited herein.

The interface unit 608 is an interface connecting an external apparatus to the terminal 600. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, a headset jack, and the like. The interface unit 608 may be configured to receive input (for example, data information and power) from the external apparatus and transmit the received input to one or more elements in the terminal 600, or may be configured to transmit data between the terminal 600 and the external apparatus.

The memory 609 may be configured to store software programs and various data. The memory 609 may mainly include a program storage area and a data storage area. The program storage area may store an operating system, an application required by at least one function (for example, a sound playback function and an image playback function), and the like. The data storage area may store data (for example, audio data and an address book) created based on the use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and lines, and performs various functions of the terminal and processes data by running or executing software programs and/or modules stored in the memory 609 and invoking data stored in the memory 609, to monitor the terminal as a whole. The processor 610 may include one or more processing units. Optionally, the processor 610 may integrate an application processor and a modem processor. The application processor mainly deals with an operating system, a user interface, and an application. The modem processor mainly deals with wireless communication. It may be understood that the modem processor may not be integrated into the processor 610.

The terminal 600 may further include a power supply 611 (for example, a battery) that supplies power to various components. Optionally, the power supply 611 may be logically connected to the processor 610 by using a power supply management system, to perform functions of managing charging, discharging, and power consumption by using the power supply management system.

In addition, the terminal 600 includes some function modules not shown, and details are not described herein.

Optionally, an embodiment of the present disclosure further provides a terminal, including a processor 610, a memory 609, and a computer program stored in the memory 609 and executable on the processor 610. When the computer program is executed by the processor 610, the processes in the embodiment of the channel access method are implemented, and the same technical effect can be achieved. To avoid repetition, details are not described herein again.

Figure 7:
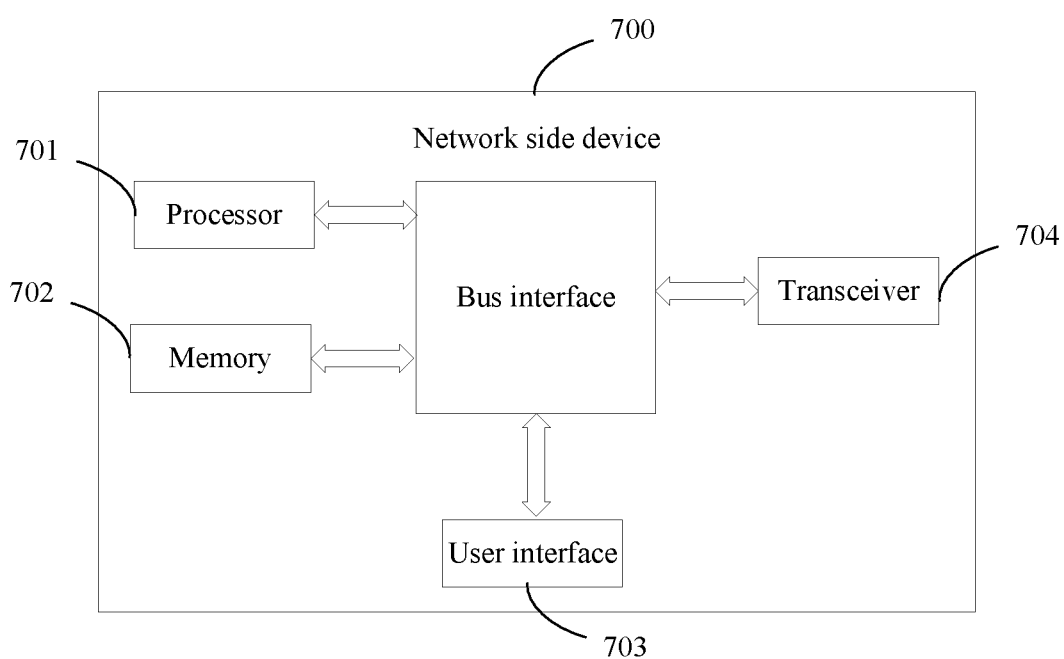
FIG. 7 is a second structural diagram of a network side device according to an embodiment of the present disclosure.

FIG. 7 is a second structural diagram of a network side device according to an embodiment of the present disclosure. As shown in FIG. 7, the network side device 700 includes: a processor 701, a memory 702, a user interface 703, a transceiver 704, and a bus interface.

In this embodiment of the present disclosure, the network side device 700 further includes a computer program stored in the memory 702 and executable on the processor 701. When the computer program is executed by the processor 701, the following step is implemented:

transmitting a mapping between service information and a channel access parameter.

Optionally, the channel access parameter includes at least one of a channel access priority class and a channel access type.

Optionally, the service information includes at least one of a trigger event and information about a logical channel.

Optionally, in a random access procedure, the trigger event includes at least one of the following:

initial access for RRC idle mode or inactive mode;
mode transition from the RRC inactive mode;
an RRC connection re-establishment procedure;
handover;
addition or modification of a PSCell;
downlink data or uplink data arrival during RRC connected modewhen an uplink synchronization status is out-of-synchronization;
establishment of uplink timing alignment for a SCell;
request for system information; and Optionally, the information about the logical channel includes at least one of the following:

an identity of the logical channel;
a group identity of the logical channel;
a priority of the logical channel;
a cell identity corresponding to the logical channel;
a cell type identity corresponding to the logical channel;
a cell group corresponding to the logical channel;
data-type control signaling or service data corresponding to the logical channel; and
a control signaling type corresponding to the logical channel.

In FIG. 7, a bus architecture may include any quantity of interconnected buses and bridges, which are specifically connected together by various circuits of one or more processors represented by the processor 701 and a memory represented by the memory 702. The bus architecture may further link various other circuits such as a peripheral device, a voltage regulator, and a power management circuit together. These are all well-known in the art, and therefore are not further described in this specification. The bus interface provides an interface. The transceiver 704 may be a plurality of elements, that is, include a transmitter and a receiver, and provide units for communication with various other apparatuses on a transmission medium. For different user equipment, the user interface 703 may alternatively be an interface for externally and internally connecting a required device. The connected device includes, but not limited to, a keypad, a display, a loudspeaker, a microphone, a joystick, and the like.

The processor 701 is responsible for management of a bus architecture and general processing. The memory 702 may store data used when the processor 701 performs an operation.

The network side device 700 can implement processes implemented by the network side device in the embodiment of the configuration method. To avoid repetition, details are not described herein again.

An embodiment of the present disclosure further provides a computer-readable storage medium. A computer program is stored in the computer-readable storage medium. When being executed by a processor, the computer program implements processes in the embodiment of the channel access method or the configuration method, and can achieve same technical effects. To avoid repetition, details are not described herein. The computer readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software plus a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of the claims, all of which fall within the protection of the present disclosure.

The invention claimed is:

1. A channel access method, performed by a terminal, wherein the channel access method comprises:

determining, based on a mapping between service information and a plurality of channel access parameters associated with a first physical channel, a target channel access parameter corresponding to first service information, wherein the first service information comprises a service type triggering the first physical channel, and each of the plurality of channel access parameters comprises a channel access priority class or a channel access tyke; and accessing the first physical channel based on the target channel access parameter.

2. The method according to claim 1, wherein the service information comprises at least one of a trigger event and information about a logical channel.

3. The method according to claim 2, wherein in a random access procedure, the trigger event comprises at least one of the following:
- initial access for radio resource control (RRC) idle mode or inactive mode;
- mode transition from the RRC inactive mode;
- an RRC connection re-establishment procedure;
- handover;
- addition or modification of a primary secondary cell (PSCell);
- downlink data or uplink data arrival during RRC connected mode when an uplink synchronization status is out-of-synchronization;
- establishment of uplink timing alignment for a secondary cell (SCell);
- request for system information; or
- beam failure recovery.

4. The method according to claim 2, wherein the information about the logical channel comprises at least one of the following:
- an identity of the logical channel;
- a group identity of the logical channel;
- a priority of the logical channel;
- a cell identity corresponding to the logical channel;
- a cell type identity corresponding to the logical channel;
- a cell group corresponding to the logical channel;
- data-type control signaling or service data corresponding to the logical channel; or
- a control signaling type corresponding to the logical channel.

5. The method according to claim 1, wherein when a number of elements comprised in the target channel access parameter is greater than 1, the accessing the first physical channel based on the target channel access parameter comprises:
- accessing the first physical channel by using a channel access priority class having a highest priority in the channel access priority class comprised in the target channel access parameter; or
- accessing the first physical channel by using a channel access priority class having a lowest priority in the channel access priority class comprised in the target channel access parameter; or
- accessing the first physical channel by using a channel access type having a highest priority in the channel access type comprised in the target channel access parameter; or
- accessing the first physical channel by using a channel access type having a lowest priority in the channel access type comprised in the target channel access parameter.

6. A terminal, comprising:
- a processor, a memory, and a computer program stored in the memory and executable on the processor, wherein the computer program, when executed by the processor, implements steps comprising:
- determining, based on a mapping between service information and a plurality of channel access parameters associated with a first physical channel, a target channel access parameter corresponding to first service information, wherein the first service information comprises a service type triggering the first physical channel, and each of the plurality of channel access parameters comprises a channel access priority class or a channel access type; and
- accessing the first physical channel based on the target channel access parameter.

7. The terminal according to claim 6, wherein the service information comprises at least one of a trigger event and information about a logical channel.

8. The terminal according to claim 7, wherein in a random access procedure, the trigger event comprises at least one of the following:
- initial access for Radio Resource Control (RRC) idle mode or inactive mode;
- mode transition from the RRC inactive mode;
- an RRC connection re-establishment procedure;
- handover;
- addition or modification of a Primary Secondary Cell (PSCell);
- downlink data or uplink data arrival during RRC connected mode when an uplink synchronization status is out-of-synchronization;
- establishment of uplink timing alignment for a Secondary Cell (SCell);
- request for system information; or
- beam failure recovery.

9. The terminal according to claim 7, wherein the information about the logical channel comprises at least one of the following:
- an identity of the logical channel;
- a group identity of the logical channel;
- a priority of the logical channel;
- a cell identity corresponding to the logical channel;
- a cell type identity corresponding to the logical channel;
- a cell group corresponding to the logical channel;
- data-type control signaling or service data corresponding to the logical channel; or
- a control signaling type corresponding to the logical channel.

10. The terminal according to claim 6, wherein when a number of elements comprised in the target channel access parameter is greater than 1, the processor is specifically configured to:
- access the first physical channel by using a channel access priority class having a highest priority in the channel access priority class comprised in the target channel access parameter; or
- access the first physical channel by using a channel access priority class having a lowest priority in the channel access priority class comprised in the target channel access parameter; or
- access the first physical channel by using a channel access type having a highest priority in the channel access type comprised in the target channel access parameter; or
- access the first physical channel by using a channel access type having a lowest priority in the channel access type comprised in the target channel access parameter.

11. A non-transitory computer-readable storage medium, wherein the computer-readable storage medium stores a computer program, and the computer program, when executed by a processor, implements a channel access method comprising:
- determining, based on a mapping between service information and a plurality of channel access parameters associated with a first physical channel, a target channel access parameter corresponding to first service information, wherein the first service information comprises a service type triggering the first physical channel, and each of the plurality of channel access parameters comprises a channel access priority class or a channel access type; and accessing the first physical channel based on the target channel access parameter.

12. The non-transitory computer-readable storage medium according to claim 11, wherein the service information comprises at least one of a trigger event and information about a logical channel.

13. The non-transitory computer-readable storage medium according to claim 12, wherein in a random access procedure, the trigger event comprises at least one of the following:

initial access for radio resource control (RRC) idle mode or inactive mode;
   mode transition from the RRC inactive mode;
   an RRC connection re-establishment procedure;
   handover;
   addition or modification of a primary secondary cell (PSCell);
   downlink data or uplink data arrival during RRC connected mode when an uplink synchronization status is out-of-synchronization;
   establishment of uplink timing alignment for a secondary cell (SCell);
   request for system information; or
   beam failure recovery.

14. The non-transitory computer-readable storage medium according to claim 12, wherein the information about the logical channel comprises at least one of the following:

an identity of the logical channel;
   a group identity of the logical channel;
   a priority of the logical channel;
   a cell identity corresponding to the logical channel;
   a cell type identity corresponding to the logical channel;
   a cell group corresponding to the logical channel;
   data-type control signaling or service data corresponding to the logical channel; or
   a control signaling type corresponding to the logical channel.

15. The non-transitory computer-readable storage medium according to claim 11, wherein when a number of elements comprised in the target channel access parameter is greater than 1, the accessing ti first physical channel based on the target channel access parameter comprises:

accessing the first physical channel by using a channel access priority class having a highest priority in the channel access priority class comprised in the target channel access parameter; or
   accessing the first physical channel by using a channel access priority class having a lowest priority in the channel access priority class comprised in the target channel access parameter; or
   accessing the first physical channel by using a channel access type having a highest priority in the channel access type comprised in the target channel access parameter; or
   accessing the first physical channel by using a channel access type having a lowest priority in the channel access type comprised in the target channel access parameter.

* * * * *